(12) United States Patent
Macharia et al.

(10) Patent No.: US 8,755,939 B2
(45) Date of Patent: Jun. 17, 2014

(54) THROUGHPUT/YIELD OPTIMIZED MODEL PREDICTIVE CONTROL

(75) Inventors: Maina A. Macharia, Round Rock, TX (US); Michael E. Tay, Georgetown, TX (US); Patrick D. Noll, Richardson, TX (US); James F. Bartee, Stilesville, IN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 12/165,371

(22) Filed: Jun. 30, 2008

(65) Prior Publication Data

US 2009/0326695 A1 Dec. 31, 2009

(51) Int. Cl.
*G05B 21/00* (2006.01)
*G01N 31/00* (2006.01)
*G06G 7/48* (2006.01)

(52) U.S. Cl.
USPC ............ 700/272; 700/266; 702/22; 703/2; 703/12

(58) Field of Classification Search
USPC ........ 700/266, 268, 103; 703/2, 6, 12; 702/22
See application file for complete search history.

(56) References Cited

U.S. PATENT DOCUMENTS

| | | | |
|---|---|---|---|
| 3,379,421 A | 4/1968 | Putman | |
| 4,623,968 A * | 11/1986 | Niese | 700/266 |
| 6,496,781 B1 | 12/2002 | Chen et al. | |
| 2004/0033457 A1 | 2/2004 | Zhang et al. | |
| 2007/0078530 A1 | 4/2007 | Blevins et al. | |
| 2008/0028675 A1 | 2/2008 | Clifford et al. | |
| 2008/0103747 A1 | 5/2008 | Macharia et al. | |
| 2008/0103748 A1 | 5/2008 | Axelrud et al. | |
| 2008/0104003 A1 | 5/2008 | Macharia et al. | |
| 2008/0108048 A1 | 5/2008 | Bartee et al. | |
| 2008/0109100 A1 | 5/2008 | Macharia et al. | |
| 2008/0109200 A1 | 5/2008 | Bartee et al. | |
| 2008/0167852 A1 | 7/2008 | Bartee et al. | |

FOREIGN PATENT DOCUMENTS

EP 0303345 A2 2/1989

OTHER PUBLICATIONS

Carlos A. Cardona, Oscar J. Sanchez, Fuel ethanol production: Process design trends and integration opportunities, Bioresource Technology 98 (2007) 2415-2457.*
B. Kamm, M. Kamm, Principles of biorefineries, Appl Microbiol Biotechnol (2004) 64: 137-145.*
J. M. Marchetti, V. U. Miguel, A. F. Errazu, Possible methods for biodiesel production, Renewable and Sustainable Energy Reviews 11 (2007) 1300-1311.*
U.S. Appl. No. 12/052,117, filed May 1, 2008, Stephenson et al.
U.S. Appl. No. 12/052,159, filed May 20, 2008, Stephenson et al.
U.S. Appl. No. 12/242,531, filed Sep. 30, 2008, Macharia et al.
U.S. Appl. No. 12/242,568, filed Sep. 30, 2008, Macharia et al.
U.S. Appl. No. 12/242,606, filed Sep. 30, 2008, Macharia et al.
U.S. Appl. No. 12/242,635, filed Sep. 30, 2008, Macharia et al.

* cited by examiner

*Primary Examiner* — Dean Kwak
(74) *Attorney, Agent, or Firm* — Fletcher Yoder P.C.

(57) ABSTRACT

The present invention provides novel techniques for optimizing throughput and yield using model predictive control techniques. In particular, the present techniques are presented in the context of biofuel production, wherein the trade off between yields of biofuel production and overall system throughput may be optimized. However, the present techniques may also be applied to any other suitable applications where a batch process of the system may affect a change in a property of the produced product, such as liquor processing.

20 Claims, 6 Drawing Sheets

THROUGHPUT/YIELD OPTIMIZED MODEL PREDICTIVE CONTROL

BACKGROUND

The present invention relates generally to control systems, and more particularly to model predictive control employing novel techniques for optimizing throughput and yield.

Many processing applications include at least one batch process and at least one continuous process. In these types of systems, a major control issue is the optimization of throughput through the system. For instance, material through the continuous processes may continually flow through the process. However, material may only enter the batch process after a previous batch has been completely processed and may only exit once the batch process has been completed. As such, inventory levels at the continuous processes may remain generally constant whereas inventory levels at the batch processes may fluctuate over time, increasing at the beginning of a batch process and decreasing at the end of a batch process. Therefore, a main issue in the control of such systems may be to minimize the occurrence of supply constraints between the batch and continuous processes. In addition, a batch process of the system may affect a property of the product such that the property is enhanced the longer the batch process is allowed to continue. However, allowing the batch process to continue for longer periods of time may also decrease the overall system throughput. Therefore, a trade off may be made between overall system throughput and optimization of such properties, such as system yield.

BRIEF DESCRIPTION

The present invention provides novel techniques for optimizing throughput and yield using model predictive control. In particular, the present techniques are presented in the context of biofuel production, wherein the trade off between yields of biofuel production and overall system throughput may be optimized. However, the present techniques may also be applied to any other suitable applications where a batch process of the system may affect a change in a property of the produced product.

In general, the present techniques provide a method for controlling batch and continuous processes. The method includes calculating a yield of a batch process as a function of residence time. For example, a projected ethanol trajectory path associated with a fermentation batch process of a biofuel production system may be calculated. The method also includes determining a desired throughput of a continuous process (e.g., the total biofuel production system throughput). The method further includes determining an optimal output of a system based on the calculated yield and the desired throughout. This determination may take into account model predictive control and optimization techniques to generate model outputs which may be optimized with respect to throughput and yield. The method also includes setting the batch process residence time and the continuous process throughput based upon the optimal output determinations. In other words, once optimization calculations have been performed, the residence time of the fermentation batch process (or batch fermentation feed rate) may be set to attain the optimized throughput and yield of the biofuel production system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
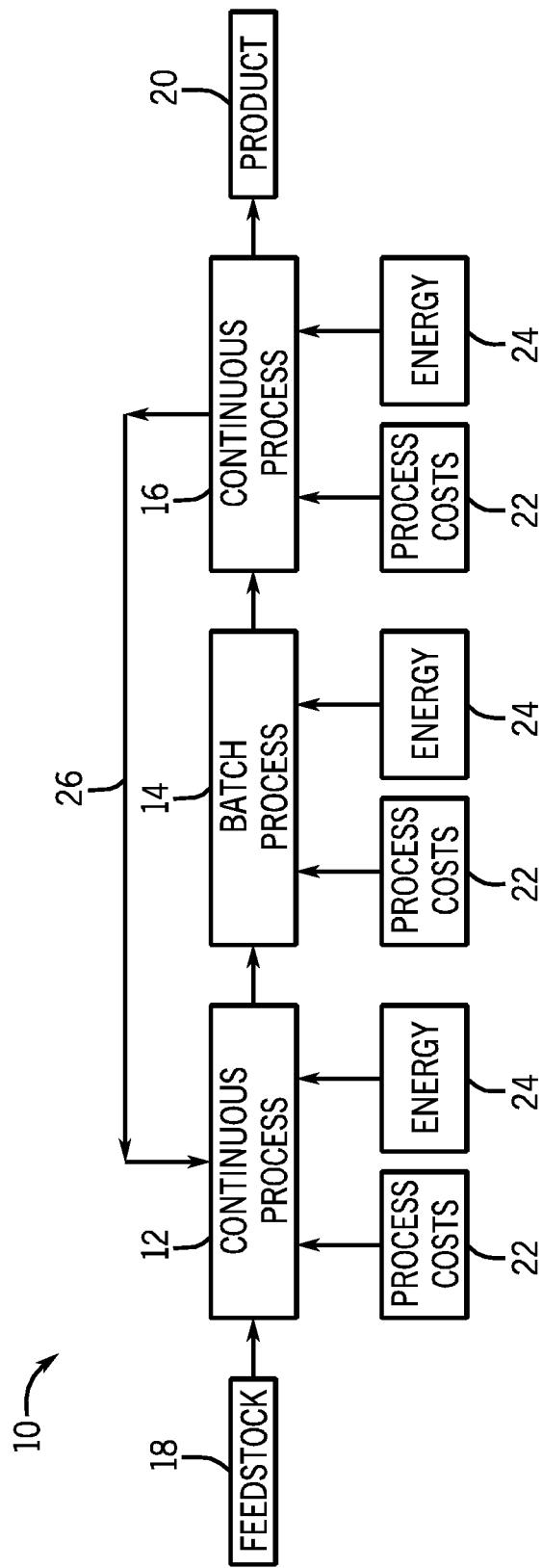
FIG. 1 is a diagram of a system utilizing both batch and continuous processes.

Turning now to the drawings, FIG. 1 is a diagram of a system 10 utilizing both batch and continuous processes. In particular, the system 10 may include a first continuous process 12 followed by a batch process 14 followed by a second continuous process 16. In the illustrated embodiment, feedstock 18 enters the first continuous process 12 and product 20 exits from the second continuous process 16. The feedstock 18 may be converted into the product 20 by the continuous processes 12, 16 and the batch process 14. In addition, process costs 22 and energy 24 may be two other inputs into each of the continuous processes 12, 16 and the batch process 14. Finally, a recycle loop 26 may be used to recycle from the second continuous process 16 to the first continuous process 12. The inputs into and connections between the continuous processes 12, 16 and the batch process 14 illustrated in FIG. 1 are merely representative and are not intended to be limiting.

In systems like system 10, a major control issue may be the optimization of throughput through the system 10. For instance, in the illustrated embodiment, the feedstock 18 may be fed into the first continuous process 12 at a continuous rate while the product 20 may similarly exit the second continuous process 16 at a continuous rate. However, the processing of the batch process 14 may neither receive inputs nor generate outputs at a continuous rate. Rather, output from the first continuous process 12 may enter the batch process 14 only at such time as a previous batch has been processed by the batch process 14. Similarly, batches from the batch process 14 may only be output to the second continuous process 16 after the processing of that particular batch has been completed by the batch process 14.

As such, inventory levels at the continuous processes 12, 16 may generally remain generally constant in that the inputs into these processes are continuously converted into outputs. However, inventory levels at the batch process 14 may fluctuate over time, increasing at the beginning of a batch process and decreasing at the end of a batch process. Therefore, a main issue may be to minimize occurrence of supply constraints between the continuous processes 12, 16 and the batch process 14. In addition, as described in greater detail below, the batch process 14 may affect a property of the product 20 which may generally affect the quality of the product 20. In particular, the property of the product 20 may be enhanced the longer the batch process 14 is allowed to continue. However, allowing the batch process 14 to continue for longer periods of time may force the overall system throughput to be decreased. An exemplary system 10 which contains multiple continuous processes and at least one batch process is a biofuel production plant.

Figure 2:
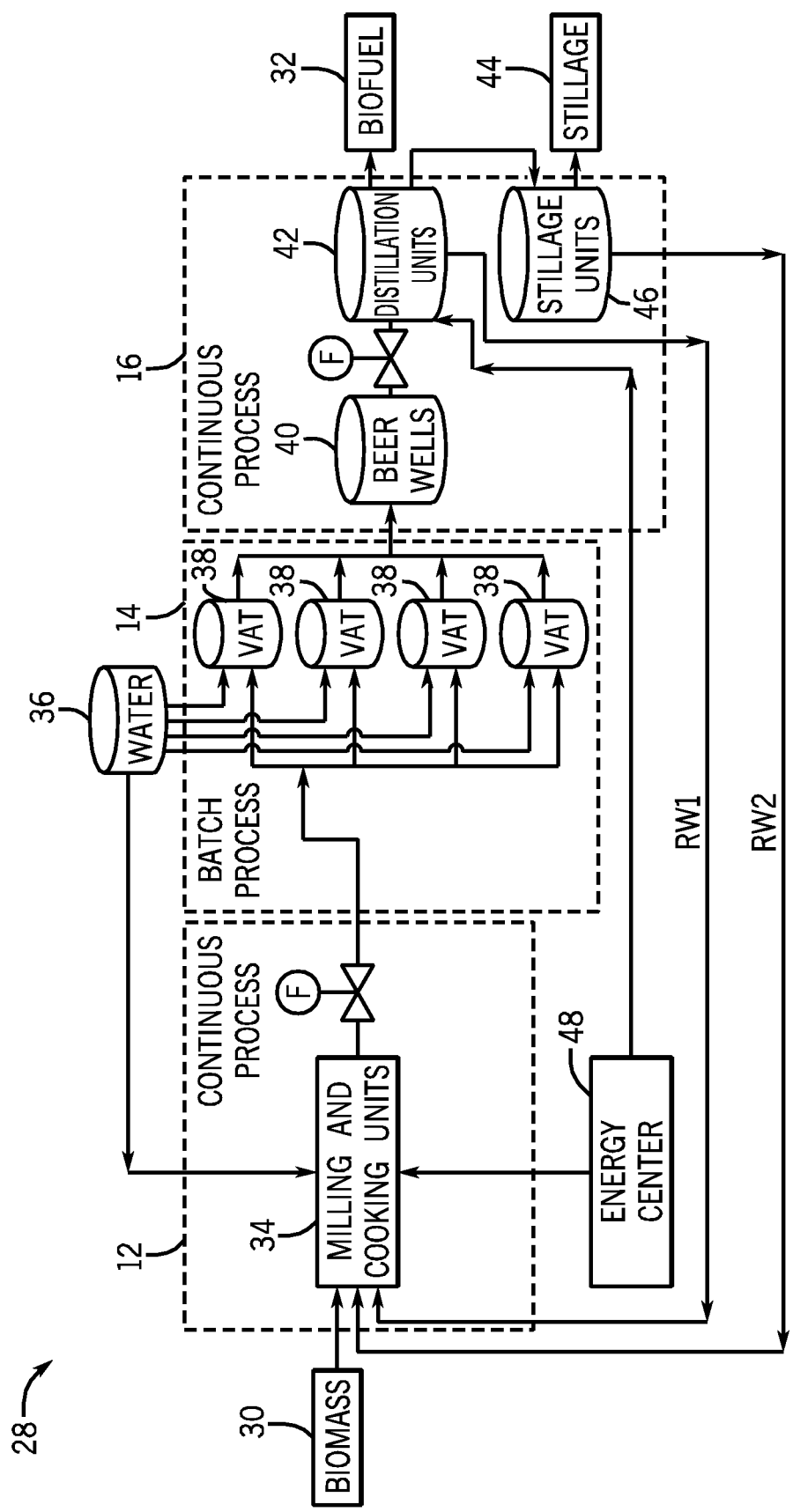
FIG. 2 is a diagram of an exemplary biofuel production plant containing batch and continuous processes.

FIG. 2 is a diagram of an exemplary biofuel production plant 28, illustrating how biomass 30 may be processed through several stages to produce biofuel 32. Biomass 30 may first be provided to a milling and cooking process, e.g., milling and cooking units 34, where water 36 (and possibly recycled water RW1 and RW2) may be added and the biomass 30 may be broken down to increase the surface area-to-volume ratio. This increase in surface area may allow for sufficient interaction of the water 36 and biomass 30 surface area to achieve a solution of fermentable sugars in water 36. The mixture, a biomass 30 and water 36 slurry, may be cooked to promote an increase in the amount of contact between the biomass 30 and water 36 in solution and to increase the separation of carbohydrate biomass from non-carbohydrate biomass. The output of the milling and cooking units 34 (i.e., the fermentation feed or mash) may then be sent to a fermentation process, where one or more fermentation vats 38 may operate to ferment the biomass/water mash produced by the milling and cooking units 34.

The fermentation process may require additional water 36 to control the consistency of material to the fermentation vats 38 (also referred to herein as a fermenter or fermentation tank). Biomass 30 may be converted by yeast and enzymes into a biofuel 32 and by-products such as carbon dioxide, water and non-fermentable biomass (solids), in the fermentation vats 38. The fermentation process is a batch process and may include multiple fermenters operating in parallel. The batch start times may be staggered as discussed below with respect to FIG. 3 in order to optimize the utilization of the beer wells 40 capacity and smoothly distribute the flow of fermentation feed to the fermentation process and the flow of biofuel 32 and stillage as output from the fermentation process.

After being temporarily stored in the beer wells 40, the output from the fermentation vats 38 may be sent to a distillation process, e.g., one or more distillation units 42, to separate biofuel 32 from water 36, carbon dioxide, and non-fermentable solids. If the biofuel 32 has to be dehydrated to moisture levels less than 5% by volume, the biofuel 32 may be processed through a processing unit called a molecular sieve or similar processing units (not shown). The finalized biofuel 32 may then be processed to ensure it is denatured and not used for human-consumption.

The distillation units 42 may separate the biofuel 32 from water 36. Water 36 may be used in the form of steam for heat and separation, and the condensed water may be recycled (RW1) back to the milling and cooking units 34. Stillage (non-fermentable solids and yeast residue) 44, the heaviest output of the distillation units 42, may be sent to stillage processing units 46 for further development of co-products from the biofuel 32 production process.

The stillage processing units 46 may separate additional water from the cake solids and recycle the water (RW2) back to the milling and cooking units 34. Several stillage processing options may be utilized, including: (1) selling the stillage with minimal processing and (2) further processing the stillage by separating moisture from the solid products via one or more centrifuge units (not shown). Using the centrifuge units, the non-fermentable solids may be transported to dryers (not shown) for further moisture removal. A portion of the stillage liquid (concentrate) may also be recycled back to the fermentation vats 38. However, the bulk of the flow may generally be sent to evaporator units (not shown), where more liquid may be separated from the liquid stream, causing the liquid stream to concentrate into syrup, while solid stillage may be sent to a drying process, e.g., using a drying unit or evaporator, to dry the solid stillage to a specified water content. The syrup may then be sent to a syrup tank (not shown). Syrup in inventory may be processed using a number of options. For instance, the syrup may be: (1) sprayed in dryers to achieve a specified color or moisture content, (2) added to the partially dried stillage product, or (3) sold as a separate liquid product. The evaporator units may have a water by-product stream that is recycled back to the milling and cooking units 34.

An energy center 48 may supply energy to many of the processing units, e.g., the milling and cooking units 34, the distillation 42 and mole-sieve units, and the stillage processing units 46. The energy center 48 may constitute a thermal oxidizer unit and heat recovery steam generator (HRSG) that may destroy volatile organic compounds (VOCs) and provide steam to the evaporators, distillation units 42, cooking system units (e.g., in 34), and dehydration units. The energy center 48 may typically be the largest source of heat in a biofuel plant 28.

Each of the illustrated sub-processes may operate within the larger biofuel production process to convert biomass 30 to biofuel 32 and possibly one or more co-products. Thus, the biofuel production plant 28 may typically include four plant sections: milling/cooking, fermentation, distillation/sieves, and stillage processing. Each of these sub-processes may be at least partially dependent upon operation of one or more of the other sub-processes. Moreover, operating conditions that may be optimal for one sub-process may entail or cause inefficiencies in one or more of the other sub-processes. Thus, a plant bottleneck, meaning a local limitation that limits or restricts a global process, may occur in any of the above four sub-processes, thus limiting the overall operation of the biofuel production plant 28.

As illustrated, the biofuel production plant 28 may be viewed as an integration of batch and continuous processes. For example, the fermentation process is a batch process, where one or more fermentation vats, referred to as fermenters, are operated (e.g., in parallel) to ferment successive batches of biomass/water slurry to generate biofuel. The batch fermentation (including, for example, fermentation cycle time and solids concentration) may typically be adjusted to operate the entire biofuel production plant 28, possibly subject to one or more active process constraints. Other sub-processes of the biofuel production process are continuous processes, i.e., are processes in which a substantially continuous stream of material is processed or operated on with substantially continuous input and output of the process. Examples of continuous sub-processes within the biofuel production plant 28 include, but are not limited to, cooking and milling, distillation and dehydration, and stillage processes. Each of these sub-processes may have respective objectives and constraints particular to that sub-process, possibly in conflict or competition with one another. Moreover, due to the substantial differences between batch processing and continuous processing, objectives for these two types of processes are often at odds with one another.

The control of these sub-processes may be performed manually, e.g., based on decisions of a human operator, or may only be locally automated, e.g., via proportional-integral-derivative (PID) inventory controls of fermentation inventory and fermentation feed inventory. However, given the complexity of the relationships among the many factors or variables, such manual control generally results in significant inefficiencies, sub-optimal yields, etc.

Thus, an operating challenge for biofuel production is to manage the various sub-processes, and possibly the entire system or process, to automatically respond to a constraint or disruption in the production system or process. As described in greater detail below, integrated model predictive control may be used to manage the biofuel production process in a substantially optimal manner, balancing various, and possibly competing, objectives of the sub-processes to approach, meet, and/or maintain objectives for the overall process. More specifically, model predictive control may be used to manage batch and continuous processes in an integrated manner to operate the biofuel production process in an optimal fashion.

Figure 3:
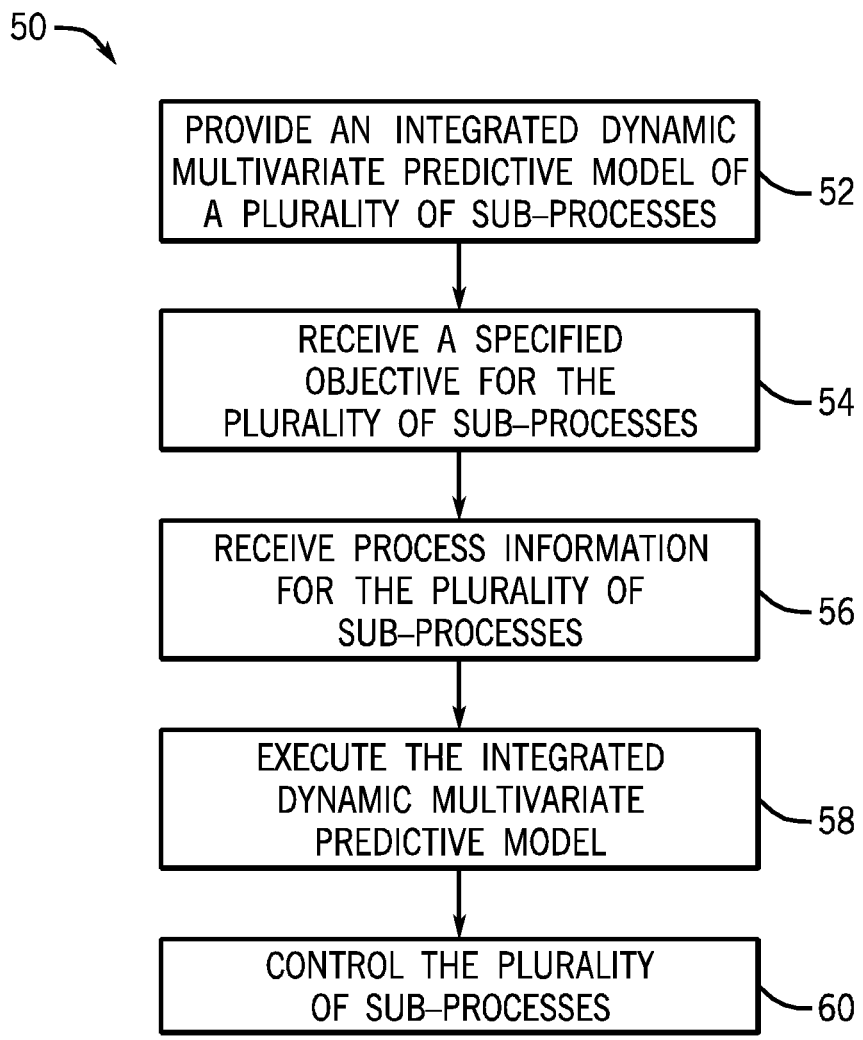
FIG. 3 is a flowchart of an exemplary method for integrated model predictive control of a biofuel production process.

FIG. 3 is a flowchart of an exemplary method 50 for such integrated model predictive control of a biofuel production process. More specifically, embodiments of the method 50 may apply model predictive control techniques to manage multiple sub-processes of the biofuel production process in an integrated manner. Note that in various embodiments, many of the method steps may be performed concurrently, in a different order than shown, or may be omitted. Additional method steps may also be performed.

In step 52, an integrated dynamic multivariate predictive model representing a plurality of sub-processes of the biofuel production process may be provided. The plurality of sub-processes may include at least one batch process, and at least one continuous process. For example, the at least one batch process may include a fermentation process for the biofuel production process which, as described above, processes the fermentation mash or slurry in batches in one or more fermentation vats or tanks. The at least one continuous process may include one or more continuous process of the biofuel production process such as, but not limited to, a cooking and milling process, a distillation and dehydration process, a stillage process, and so forth.

In step 54, a specified objective for the plurality of sub-processes may be received. The objective may specify a desired behavior or outcome of the biofuel production process. In certain embodiments, the objective may be somewhat complex or compound. For example, the objective may include a global objective and a plurality of sub-objectives directed to at least a subset of the plurality of sub-processes, including the at least one batch process and the at least one continuous process. In other words, the specified objective may include an overall objective for the biofuel production process, e.g., maximize throughput, efficiency, and so forth, and may also include various subsidiary objectives related specifically to the respective sub-processes. In addition, the sub-objectives may be mutually exclusive or competitive with respect to each other and/or with respect to the global objective.

Exemplary objectives may include, but are not limited to, one or more operator specified objectives, one or more predictive model specified objectives, one or more programmable objectives, one or more target feed rates, one or more cost objectives, one or more quality objectives, one or more equipment maintenance objectives, one or more equipment repair objectives, one or more equipment replacement objectives, one or more economic objectives, one or more target throughputs for the biofuel production process, one or more objectives in response to emergency occurrences, one or more dynamic changes in materials inventory information, one or more dynamic changes in available process energy constraints, or one or more dynamic changes in one or more constraints on the biofuel production process, and so forth.

In step 56, process information related to the plurality of sub-processes may be received from the biofuel production process. This process information may be any type of process information, including state or condition information measured by sensors (e.g., temperatures, pressures, real-time measurements of the biofuel in the fermentation system, and so forth), computed algorithmically, inferred from models (i.e., inferential models), taken from lab values, entered by operators, and so forth. The process information may further include equipment settings, flow rates, material properties (e.g. densities), content profiles, purity levels, ambient conditions (e.g., time of day, temperature, pressure, humidity, and so forth), economic or market conditions (e.g., cost of materials or product), and so forth. In other words, the process information may include any information that affects or influences any part of the biofuel production process.

In step 58, the integrated dynamic multivariate predictive model may be executed in accordance with the objective using the received process information as input, thereby generating model output comprising target values of one or more controlled variables related to one or more of the plurality of sub-processes in accordance with the objective. In other words, the model may be executed to determine target values for manipulated variables for one or more of the sub-processes that may be used to control the sub-processes in such a way as to attempt to meet the specified objective.

In step 60, the plurality of sub-processes of the biofuel production process may be controlled in accordance with the target values and the objective. In other words, a controller (or a plurality of controllers) may modulate or otherwise control various operational aspects of the sub-processes in accordance with the target values of the manipulated variables. In some embodiments, the target values may simply be used as set points by the controller. In other words, the controller may set respective inputs of the various sub-processes to the respective target values. For example, controlling the plurality of sub-processes of the biofuel production process in accordance with the target values and the objective may include operating one or more controllers to control one or more of the following: one or more material feed rates, one or more water flows, one or more molecular sieve regenerations, one or more heat sources, and so forth.

Steps 54, 56, 58, and 60 of the method 50 may be performed a plurality of times in an iterative manner to operate the biofuel production process in a substantially optimal fashion. In other words, the method 50 described above may be performed substantially continuously, such as at a specified frequency, providing control of the biofuel production process in substantially real time to optimize the biofuel production process with respect to the specified objective.

In embodiments where multiple objectives may be provided, possibly at odds with one another, an optimizer may be used to balance the various sub-objectives in attempting to meet the global objective. In other words, an optimizer may be used to determine how to compromise with respect to the various sub-objectives in attempting to achieve the global objective. Thus, in certain embodiments, executing the integrated dynamic multivariate predictive model may include an optimizer executing the integrated dynamic multivariate predictive model to generate the model output. The generated model output may include the target values of one or more variables related to one or more of the plurality of sub-processes in accordance with the global objective and the plurality of sub-objectives. In certain embodiments, the optimizer may execute the integrated dynamic multivariate predictive model a plurality of times in an iterative manner. For example, the optimizer may repeatedly execute the model using various inputs and compare the resulting outputs to the specified objective (including the sub-objectives), thereby searching the solution space for input configurations that optimize the outcome, e.g., that allow the global objective to be met or at least approached, while minimizing the compromises made with respect to the various sub-objectives.

In certain embodiments, the method 50 may further include receiving constraint information specifying one or more constraints, such as limitations on one or more aspects or variables of the biofuel production process. The optimizer may execute the integrated dynamic multivariate predictive model in accordance with the objective using the received process information and the one or more constraints as input, thereby generating the model output in accordance with the objective and subject to the one or more constraints. The one or more constraints may include any such limitation on the biofuel production process including, but not limited to, one or more of: batch constraints (e.g., fermentation time), water constraints, feed constraints, equipment constraints, capacity constraints, temperature constraints, pressure constraints, energy constraints, market constraints, economic constraints, environmental constraints, legal constraints, operator-imposed constraints, and so forth. Furthermore, examples of equipment constraints may include, but are not limited to, one or more of: operating limits for pumps, operational status of pumps, tank capacities, operating limits for tank pressures, operational status of tanks, operating limits for valve pressures, operating limits for valve temperatures, operating limits for pipe pressures, operating limits for energy provision, operating limits for molecular sieves, and so forth. Moreover, in certain embodiments, the constraint information may include dynamic constraint information. In other words, some of the constraints may change dynamically over time. Therefore, the method 50 may automatically adjust operations taking into account these changing constraints.

Thus, embodiments of the systems and methods described above may utilize model predictive control, and possibly optimization, to manage continuous and batch processes in a biofuel production process in an integrated manner.

In certain embodiments, the method 50 may include managing all of the sub-processes described above using model predictive control to produce biofuels in a substantially optimal fashion, such as in accordance with a specified global objective. For example, the system (i.e., the optimizer, model, and/or controller) may receive and take into consideration all constraints of the fermentation batch process as well as the continuous milling and cooking processes, water-balance process, distillation/sieve process, and stillage process. The optimization objective (e.g., global objective) may integrate operating costs such as costs of production feedstocks, energy, catalysts, enzymes, and yield rate/trade-off. For the batch process, the system may have knowledge of the batch life of each vat (i.e., fermentation endpoint control). The system may then calculate a desired trajectory path (e.g., an ethanol trajectory path), which in turn may be used to calculate desired targets for fermentation feed and condition adjustments. This trajectory may be set by the optimizer taking into account the dynamic constraints of all upstream and downstream units through the horizon of control of the process. The optimizer may also calculate the optimum trajectory of control action to keep the continuous processes controlled within operating constraints and targets. For example, it may take into account that the fermentation product is sent to a surge inventory (e.g., a beer well) to feed distillation continuously. The system may then use the model predictive control and optimization techniques described above to measure or determine the system capacitance in the biofuel production system and project the optimum feed rates and fermentation cycle times.

Thus, in certain embodiments, the system may derive its measurements or process information from the process instruments or sensors, inferential models, real-time measurements of the biofuel in the fermentation system, and/or lab values, and execute linear or non-linear dynamic prediction models to solve an overall optimization objective which may typically be an economic objective function subject to dynamic constraints of both the continuous and batch sub-processes of the plant processes. The system may then execute the integrated dynamic multivariate predictive model, controller, and optimizer in accordance with the objective, e.g., the optimization function. For instance, the objective may include one or more of the following: a biofuel production objective, the value of key inputs, biomass feedstock costs, the cost of enzymes, value of biofuels and stillage product(s), the quality specifications of measured end products, and measured constraints, among others. The system may then generate outputs including one or more of the following: fermentation feed rates, distillation feed rates, distillation feed inventory, and fermentation cycle times, among others, all subject to specified constraints. Thus, the system may optimize one or more of: biofuel production rates, plant profit/cost function, yield of biofuels, enzyme per unit of biofuel, catalyst per unit of biofuel, energy per unit of biofuel, the quality specifications of all end products, and so forth, and may do so subject to and respecting all specified constraints.

Figure 4:
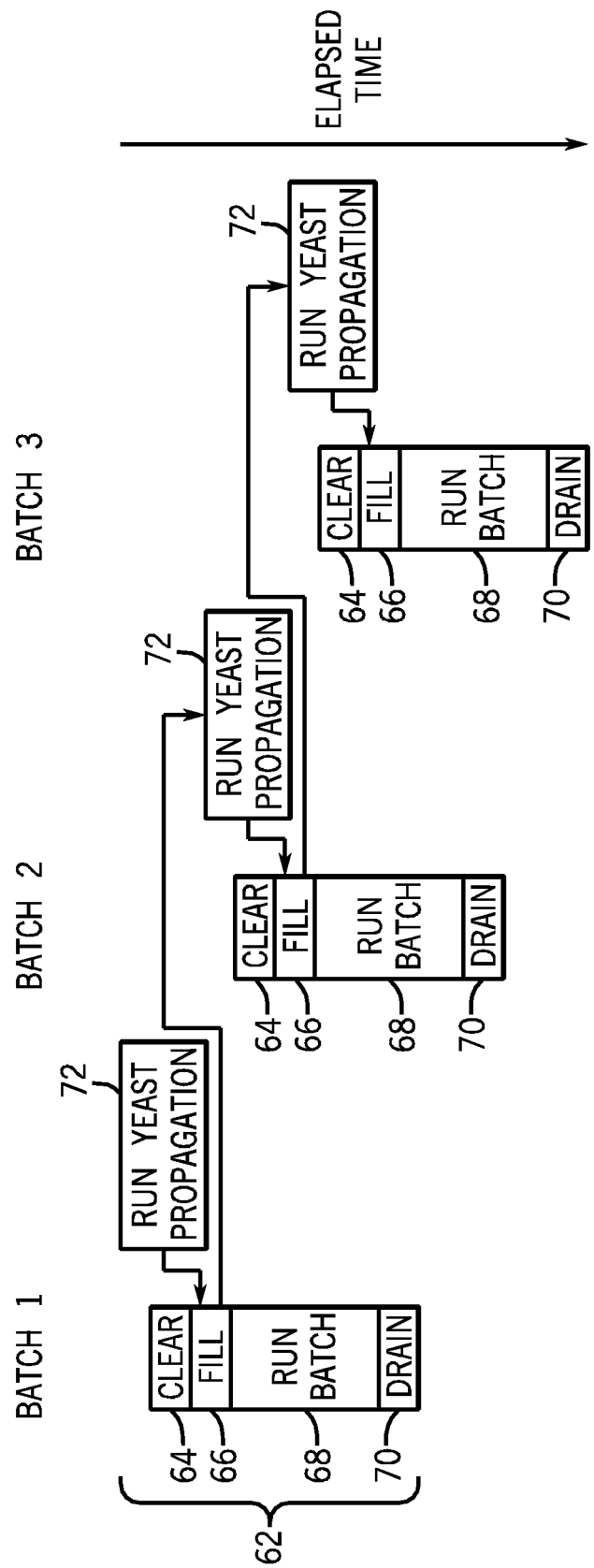
FIG. 4 is an exemplary multi-fermenter system illustrating how the fermentation process in biofuel production operates as a batch process.

As discussed above, the fermentation process in biofuel production is a batch process. FIG. 4 is an exemplary multi-fermenter system illustrating how the fermentation process in biofuel production operates as a batch process. As may be seen, each batch may be operated somewhat separately, but may include some interaction with the other batches, e.g., providing enzymes for subsequent fermenters in the sequence. For each batch, the fermentation cycle time 62 may include the fermenter cleaning time 64, the fermenter filling time 66, the batch run time 68, and the fermenter drain time 70. Yeast propagation 72 may be run as a separate step while filling each respective fermentation tank.

In this scenario, while draining may not occur continuously, each fermenter may be drained into a beer well, which may be continuously drained to feed a continuously-operated downstream process (e.g. distillation). Thus, if at the end of each batch, each fermenter makes the same volume of product at the same target biofuel concentration, then the equivalent continuous production of biofuel may be determined. Therefore, in certain embodiments, a continuous biofuel production from the batch fermenters may also be determined. Thus, a bridging equation or transform may allow modeling of fermentation batch production as a continuous production process. Similarly, an equivalent continuous production of biomass, stillage, and water may be determined.

Thus, in certain embodiments, a common framework for calculation and optimization may be achieved and classical optimization techniques may be utilized for integrated optimization across combined batch and continuous process operations. For example, where batch optimization uses optimized and controlled trajectories of enzyme volumes to support batch operations and optimized and controlled trajectories of temperature targets, and therefore cooling demand, these aspects may be calculated across each batch as a batch total and may be averaged (e.g. average enzyme consumption rate as a function of global batch/continuous process operations) or calculated at maximums and demand limits (e.g. maximum cooling demand and availability as a constraint of the global optimization). It should be noted that these examples are merely intended to be exemplary and are not intended to limit the bridging equations or transforms to any particular form or function.

Figure 5:
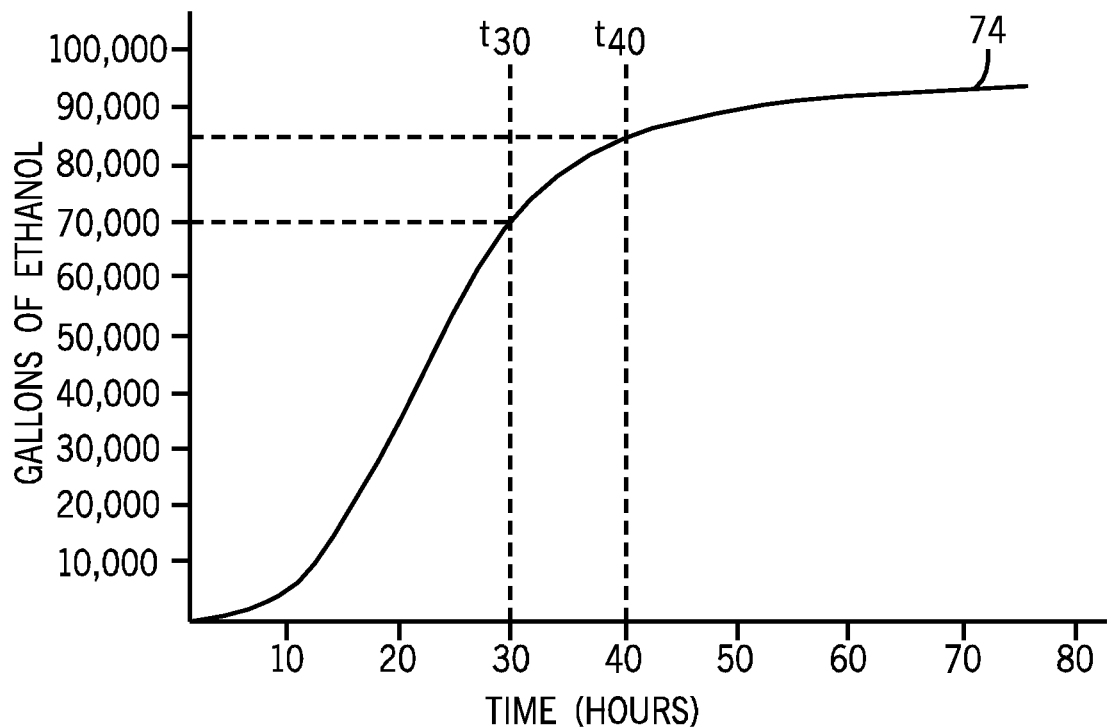
FIG. 5 is an exemplary fermentation yield curve illustrating biofuel conversion of the fermentation process over time.

As fermentation proceeds during the batch process, more sugar in the fermentation mash or slurry may be converted into biofuel. FIG. 5 is an exemplary fermentation yield curve 74 illustrating biofuel conversion of the fermentation process over time. The speed of conversion may vary throughout the life of the batch, starting slowly, increasing, and then finally slowing down towards the end of the batch. However, in general, the yield of biofuel product increases continuously through the batch process. As the fermentation time is increased, overall plant throughput rates may generally be decreased because of inventory limitations in the system. Therefore, there is a trade off to be made between throughput and biofuel yield.

This trade off between throughput and yield is non-linear in nature, time-variant, and dependent on fermentation characteristics. If the batch times are decreased, not only does the product rate to distillation process increase (e.g., since the fermentation product is available sooner and thus more often) but the fermentation feed rates must be increased to ensure batches are filled on time in keeping with the processing sequence. Conversely, if the batch times are increased, not only does the product rate to the distillation process decrease, but the fermentation feed rates must be slowed to match fermentation times. Thus, considerations that may be specific to a batch sub-process, such as fermentation, may entail changes with respect to continuous sub-processes (e.g., distillation/dehydration, cooking/milling, and/or stillage processing) and vice versa.

For example, using the illustrated fermentation yield curve 74, a 30-hour fermentation cycle time $t_{30}$ may generate 70,000 gallons of ethanol whereas a 40-hour fermentation cycle time $t_{40}$ may generate 84,000 gallons of ethanol. Therefore, 20% more ethanol may be generated during the extra 10 hours of fermentation time. However, using a 30-hour fermentation cycle time $t_{30}$ may also allow for 33.3% more overall system throughput as compared to the 40-hour fermentation cycle time $t_{40}$. Therefore, depending on circumstances including, but not limited to, market and operating conditions, it may not be advantageous to move from the 30-hour fermentation cycle time $t_{30}$ to the 40-hour fermentation cycle time $t_{40}$.

Figure 6:
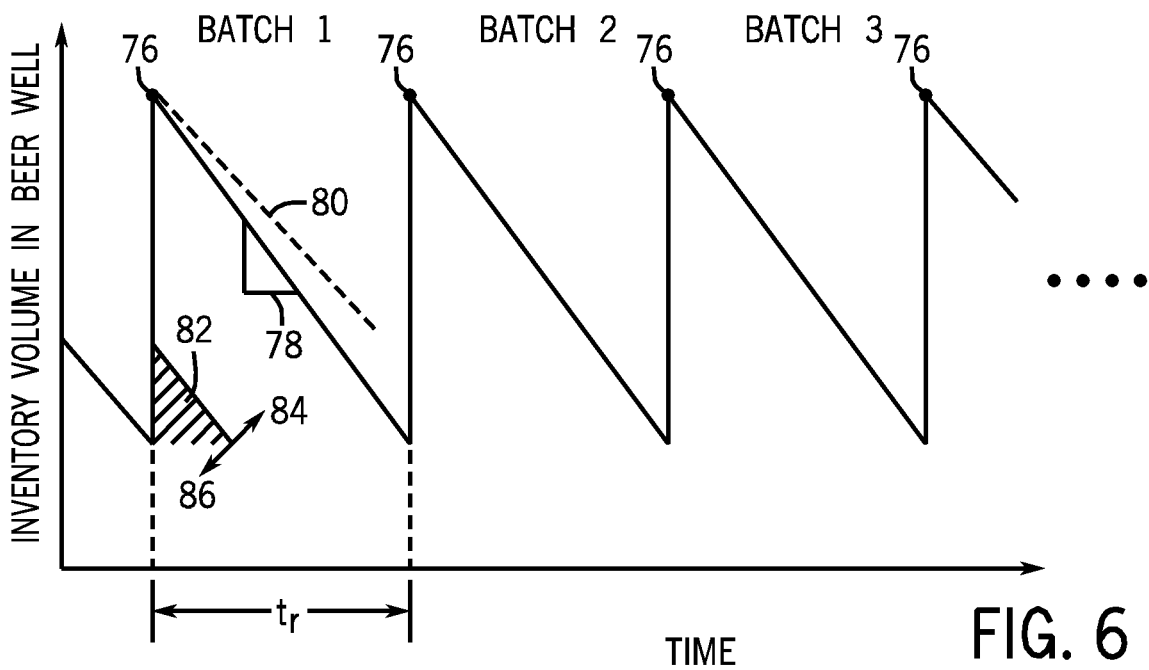
FIG. 6 is an exemplary graph of inventory volume of a beer well downstream of the fermentation process.

As discussed above, the output from the fermentation batch process may be sent to a continuous distillation process after temporarily being stored in beer wells. The beer wells essentially act as a storage conduit between the fermentation batch process and the continuous distillation process. In other words, the beer wells may act as intermediary storage for transitioning between the fluctuating inventory levels of the fermentation process and the substantially continuous inventory levels of the distillation process. FIG. 6 is an exemplary graph of inventory volume levels of a beer well downstream of the fermentation process. However, those skilled in the art will appreciate that this exemplary graph of inventory volume levels may be similar to many other storage devices where batch and continuous processes interface.

At each dump time 76, the output from the fermentation process may be dumped into a beer well, increasing the inventory volume in the beer well. Therefore, the residence time $t_r$ in the fermentation process may directly affect when the dump times 76 occur and, consequently, when the inventory volume level in the beer well increases. As time passes, the downstream distillation process may continuously drain the beer well such that the inventory volume level may gradually decrease at a rate represented by the slope 78. Therefore, this subsequent slope may be directly governed by the continuous distillation process throughput. For instance, if the throughput of the distillation process were decreased, the resulting decrease in the inventory volume of the beer well would be less steep, as illustrated by line 80.

As illustrated by volume 82, a certain percentage of the inventory volume in the beer well may be ethanol yield, such as a percentage yield of ethanol. The residence time $t_r$ in the fermentation process may directly affect the percentage yield of ethanol. For instance, if the residence time $t_r$ is increased, the percentage yield of ethanol may be increased, thereby skewing the ethanol volume 82 upward, as indicated by arrow 84. Conversely, if the residence time $t_r$ is decreased, the percentage yield of ethanol may be decreased, thereby skewing the ethanol volume downward, as indicated by arrow 86. Therefore, not only does the residence time $t_r$ in the fermentation process affect the total throughput rate and associated frequency of dumps into the beer well, but it also affects the ethanol yield rate.

Figure 7:
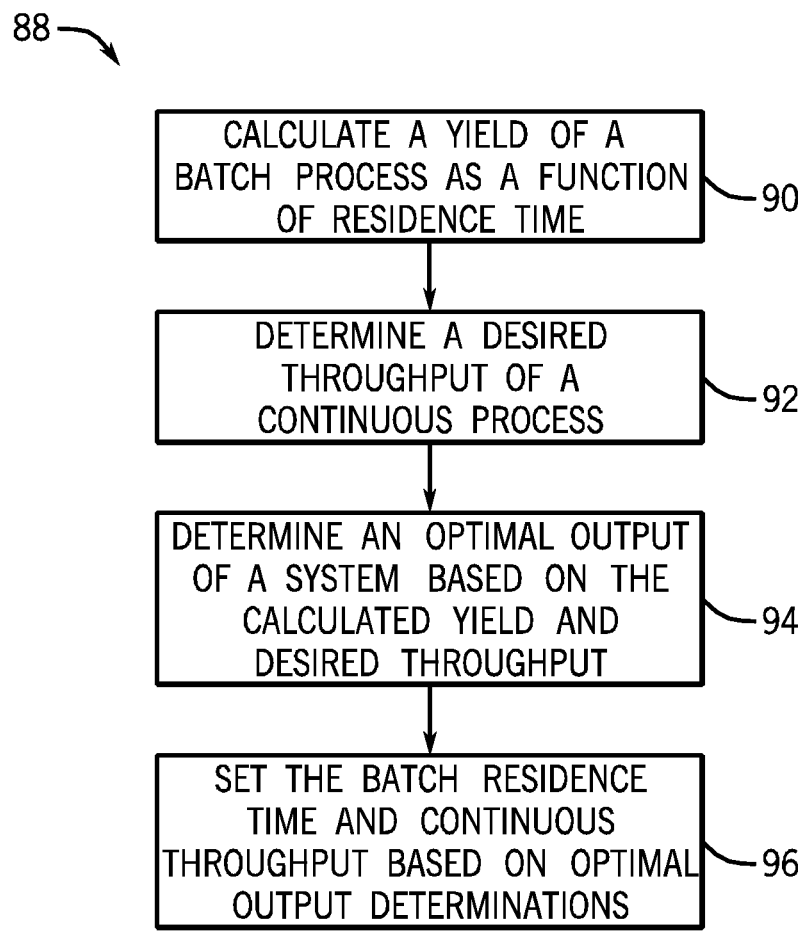
FIG. 7 is a flow chart of an exemplary method for optimizing the trade off between throughput and yield of the biofuel production process.

Using the model predictive control techniques discussed in greater detail above, it may be possible to monitor, control, and optimize the sub-processes (in particular, the fermentation process) of the biofuel production process in order to affect optimized decisions regarding the trade off between throughput and yield. For instance, FIG. 7 is a flow chart of an exemplary method 88 for optimizing the trade off between throughput and yield. The method 88 may be integrated into the model predictive control method 50 techniques discussed with respect to FIG. 3 above. Indeed, the method 88 may simply be one exemplary embodiment of the predictive model techniques discussed above.

In step 90, a yield of a batch process may be calculated as a function of residence time. This step may include calculating a projected ethanol trajectory path based on knowledge of the fermentation batch process for the particular plant. As discussed above, in general, the longer the batch residence time, the higher the percentage of produced ethanol. The calculation of the ethanol trajectory path may take into account dynamic constraints of all upstream and downstream units through the horizon of control of the process. In step 92, a desired throughput of a continuous process may be determined. Again, this may refer to the yield/throughput trade off and may, for instance, refer to the throughput produced from the distillation process. Ideally, operators of a biofuel production process would like to produce as much biofuel as possible. However, the total throughput of the biofuel production process may be considered as well.

In step 94, an optimal system output may be determined based on the calculated yield and the desired throughput. This determination may take into account the model predictive control and optimization techniques discussed in greater detail above. For instance, the batch and predictive model controller may be executed to generate model outputs which may be optimized to determine what the optimal system output may be. Then, in step 96, a batch residence time and continuous throughput may be set based on the optimal output calculations. The steps 90, 92, 94, and 96 of the method 88 may be cyclically repeated during the production process. In addition, steps 90, 92, 94, and 96 of the method 88 may be performed sequentially, simultaneously, or in any order relative to one another.

The control systems used to implement the present techniques may be open or closed. Open loop systems are only defined by the inputs and the inherent characteristics of the system or process. In the biofuel production process, the system may be the entire biofuel production plant, one sub-process of the biofuel production plant, such as the milling and cooking units, or control of a variable in a process such as the temperature of the cooking units. In a closed loop system, the inputs may be adjusted to compensate for changes in the output where, for example, these changes may be a deviation from desired or targeted measurements. A closed loop system may sense a change and provide a feedback signal to a process input. Process units in the biofuel production system may be closed loop systems if they need to be regulated subject to constraints such as product quality, energy costs, or process unit capacity.

Traditional proportional-integral-derivative (PID) controllers and other control systems such as ratio controls, feedforward controls, and process models may be used to control biofuel production processes. A distributed control system (DCS) may have many control schemes set up to control the process unit variables at the local control level.

Embodiments of the control processes described above may be implemented on a suitable computer system, controller, memory, or generally a machine readable medium. For example, each step, equation, and calculation technique may correspond to a computer instruction, logic, or software code disposed on the machine readable medium. The computer-implemented methods and/or computer code may be programmed into an electronic control unit (ECU) of the system.

The present techniques have been presented in the context of optimizing the throughput/yield trade off with respect to the production of biofuels. However, as will be appreciated by those skilled in the art, the present techniques may also be applied to any other systems where batch processes and continuous processes are used together and where there may inherently be a trade off between total system throughput and throughput yield or some other quality of the throughput (e.g., the ethanol content of a biofuel). In other words, any system where the batch process produces a product characterized by a property which changes during its time in the batch process may utilize the present techniques. For instance, the processing of liquor may be another application where the present techniques may be used. As the liquor ferments, the alcohol content, flavor, aroma, and other properties may change. As the fermentation progresses, there may be times where the trade off between throughput and the various liquor properties may be optimized. In fact, the processing of liquor may involve substantially similar predictive model-based techniques to those described above with respect to biofuel production.

Therefore, in general, the present techniques may be applied to various applications where coordination between batch and continuous processes is desired. It should be noted that the continuous processes may be upstream, downstream, or both from the batch processes. In fact, the present techniques may be applied to systems where the continuous and batch processes are located in any configuration with respect to each other. Furthermore, irrespective of the locations of the processes, the present techniques may be applied to systems using batch and continuous processes which are simply performed at different time intervals with respect to each other. Indeed, the present techniques may be applied to any systems which are conducive to being modeled using the model predictive control techniques described above. Moreover, systems where balancing of a yield of a batch process and the overall throughput of a continuous process may prove useful are particularly well-suited for use with the present techniques.

Furthermore, it should be mentioned that the use of the term "yield" herein is intended to include any property of a product or a production process which may create or affect a benefit of the product or production process. The benefit may be a direct benefit (e.g., economic benefit) or it may be an indirect benefit (e.g., reduced emissions). In other words, while in the context of biofuel production discussed above, the yield has been characterized as a percentage of ethanol produced, the yield may also refer to other various properties of the product or the production process. The overarching principle is that the overall value of a production process utilizing batch and continuous processes is not limited to the value of the overall throughput of the continuous processes. Rather, the batch processes may affect the overall value of the production process by affecting properties of either the produced product or the production process itself. In doing so, the overall value of the production process may be affected and potentially maximized using control techniques beyond simply increasing overall throughput.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
    (a) determining a desired throughput of a continuous process of a biofuel production process;
    (b) determining a non-linear relationship between residence time of a batch fermentation process of the biofuel production process and a property of ethanol generated by the batch fermentation process during the residence time using model-based predictive control algorithms;
    (c) determining an optimal residence time of the non-linear relationship at which a ratio of the property of the ethanol generated to the residence time is maximized;
    (d) calculating a yield of the batch fermentation process as a function of the optimal residence time;
    (e) determining a desired output of the biofuel production process based on the calculated yield and the desired throughput, wherein the desired output maximizes an economic value of the continuous process throughput based on a balance between the calculated yield and the desired throughput; and
    (f) controlling the biofuel production process to adjust a residence time of the batch fermentation process to the optimal residence time and to adjust a continuous process throughput of the biofuel production process based on the determined desired output.

2. The method of claim 1, comprising (g) controlling the biofuel production process to increase a feed rate of fermentation feed from a continuous milling/cooking process of the biofuel production process upstream of the batch fermentation process when the residence time of the batch fermentation process is decreased.

3. The method of claim 1, comprising (g) controlling the biofuel production process to increase a product rate from the batch fermentation process to a continuous distillation/dehydration process of the biofuel production process downstream of the batch fermentation process when the residence time of the batch fermentation process is decreased.

4. The method of claim 1, comprising (g) controlling the biofuel production process to decrease a feed rate of fermentation feed from a continuous milling/cooking process of the biofuel production process upstream of the batch fermentation process when the residence time of the batch fermentation process is increased.

5. The method of claim 1, comprising (g) controlling the biofuel production process to decrease a product rate from the batch fermentation process to a continuous distillation/dehydration process of the biofuel production process downstream of the batch fermentation process when the residence time of the batch fermentation process is increased.

6. The method of claim 1, wherein (b) determining the non-linear relationship between the residence time of the batch fermentation process of the biofuel production process and the property of the ethanol generated by the batch fermentation process during the residence time comprises calculating a projected ethanol trajectory path during the batch fermentation process.

7. The method of claim 1, comprising (b) determining the non-linear relationship between the residence time of the batch fermentation process of the biofuel production process and the property of the ethanol generated by the batch fermentation process during the residence time based on measurements derived from process instruments of the biofuel production process.

8. The method of claim 1, comprising (b) determining the non-linear relationship between the residence time of the batch fermentation process of the biofuel production process and the property of the ethanol generated by the batch fermentation process during the residence time based on inferential models of the biofuel production process.

9. The method of claim 1, comprising (b) determining the non-linear relationship between the residence time of the batch fermentation process of the biofuel production process and the property of the ethanol generated by the batch fermentation process during the residence time based on real-time measurements of the batch fermentation process.

10. The method of claim 1, comprising (b) determining the non-linear relationship between the residence time of the batch fermentation process of the biofuel production process and the property of the ethanol generated by the batch fermentation process during the residence time based on laboratory values.

11. The method of claim 1, wherein (b) determining the non-linear relationship between the residence time of the batch fermentation process of the biofuel production process and the property of the ethanol generated by the batch fermentation process during the residence time comprises executing prediction models to obtain an overall optimization objective subject to dynamic constraints of the batch fermentation process and a plurality of continuous processes of the biofuel production process.

12. The method of claim 1, comprising cyclically repeating steps (a)-(f) during operation of the biofuel production process.

13. The method of claim 1, wherein steps (a)-(f) are performed sequentially or performed simultaneously during operation of the biofuel production process.

14. The method of claim 1, wherein the property is a volume of the ethanol generated by the batch fermentation process.

15. The method of claim 1, wherein the property is an ethanol content of the ethanol generated by the batch fermentation process.

16. A method, comprising:
(a) determining a desired throughput of a continuous process of a biofuel production process;
(b) determining a non-linear relationship between residence time of a batch fermentation process of the biofuel production process and a volume of ethanol generated by the batch fermentation process during the residence time using model-based predictive control algorithms, wherein determining the non-linear relationship comprises:
calculating a projected ethanol trajectory path during the batch fermentation process; and
executing prediction models to obtain an overall optimization objective subject to dynamic constraints of the batch fermentation process and a plurality of continuous processes of the biofuel production process;
(c) determining an optimal residence time of the non-linear relationship at which a ratio of the volume of the ethanol generated to the residence time is maximized;
(d) calculating a yield of the batch fermentation process as a function of the optimal residence time;
(e) determining a desired output of the biofuel production process based on the calculated yield and the desired throughput, wherein the desired output maximizes an economic value of the continuous process throughput based on a balance between the calculated yield and the desired throughput; and
(f) controlling the biofuel production process to adjust a residence time of the batch fermentation process to the optimal residence time, to increase a feed rate of fermentation feed from a continuous milling/cooking process of the biofuel production process upstream of the batch fermentation process when the residence time of the batch fermentation process is decreased, to increase a product rate from the batch fermentation process to a continuous distillation/dehydration process of the biofuel production process downstream of the batch fermentation process when the residence time of the batch fermentation process is decreased, to decrease the feed rate of the fermentation feed from the continuous milling/cooking process of the biofuel production process upstream of the batch fermentation process when the residence time of the batch fermentation process is increased, and to decrease the product rate from the batch fermentation process to the continuous distillation/dehydration process of the biofuel production process downstream of the batch fermentation process when the residence time of the batch fermentation process is increased.

17. The method of claim 16, comprising (b) determining the non-linear relationship between the residence time of the batch fermentation process of the biofuel production process and the volume of the ethanol generated by the batch fermentation process during the residence time based on measurements derived from process instruments of the biofuel production process.

18. The method of claim 16, comprising (b) determining the non-linear relationship between the residence time of the batch fermentation process of the biofuel production process and the volume of the ethanol generated by the batch fermentation process during the residence time based on inferential models of the biofuel production process.

19. The method of claim 16, comprising (b) determining the non-linear relationship between the residence time of the batch fermentation process of the biofuel production process and the volume of the ethanol generated by the batch fermentation process during the residence time based on real-time measurements of the batch fermentation process.

20. The method of claim 16, comprising (b) determining the non-linear relationship between the residence time of the batch fermentation process of the biofuel production process and the volume of the ethanol generated by the batch fermentation process during the residence time based on laboratory values.

* * * * *